(12) United States Patent
Blaine et al.

(10) Patent No.: US 11,554,077 B1
(45) Date of Patent: *Jan. 17, 2023

(54) SYSTEM AND METHOD FOR DYNAMIC DEVICE DISCOVERY AND ADDRESS ASSIGNMENT

(71) Applicant: Hayward Industries, Inc., Berkeley Heights, NJ (US)

(72) Inventors: David M. Blaine, North Kingston, MA (US); Kenneth W. White, Jr., East Dennis, MA (US); Craig Andrew Horrocks, North Kingstown, RI (US); James Murdock, Wakefield, RI (US); Douglas M. Sawyer, Jr., Seekonk, MA (US); Carl Brunetti, Manville, RI (US); Robert Donald Heon, Warwick, RI (US); Linnette Rivera, Tyngsborough, MA (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,228

(22) Filed: Aug. 29, 2022

Related U.S. Application Data

(63) Continuation of application No. 14/213,172, filed on Mar. 14, 2014, now Pat. No. 11,426,325.
(Continued)

(51) Int. Cl.
*A61H 33/00* (2006.01)
*H04L 12/28* (2006.01)
(Continued)

(52) U.S. Cl.
CPC ........... *A61H 33/005* (2013.01); *G05B 15/02* (2013.01); *G05B 19/0423* (2013.01);
(Continued)

(58) Field of Classification Search
CPC ............... G05B 15/02; G05B 19/0423; G05B 2219/21081; G05B 2219/25096;
(Continued)

(56) References Cited

U.S. PATENT DOCUMENTS 7,155,497 B2 * 12/2006 Grover ................ H04L 61/5092
709/228
7,356,011 B1 4/2008 Waters et al.
(Continued)

OTHER PUBLICATIONS

International Search Report and Written Opinion of the International Searching Authority dated Jul. 29, 2014, issued in connection with International Application No. PCT/US2014/028858 (9 pages).
(Continued)

*Primary Examiner* — Glenton B Burgess
*Assistant Examiner* — Rachel J Hackenberg
(74) *Attorney, Agent, or Firm* — McCarter & English, LLP (57) ABSTRACT

A pool or spa system includes networked pool or spa devices that can be dynamically configured with network address by a controller. The controller can transmit a device discovery request on a network and can receive a discovery response from pool or spa devices that require a network address. The system determines and assigns the network addresses for the pool or spa devices based on unique device identifiers associated with the responding pool or spa devices. The network addresses assigned to the pool or spa device are transmitted to the pool or spa device to be used by the pool or spa devices to communicate with the controller over the network. The system can be used to discover and assign addresses to various types of pool or spa devices, such as pumps, underwater lights, chlorinators, water feature controllers, remote controllers, and/or other types of devices.

23 Claims, 7 Drawing Sheets

600

| Discovery Commands | | |
|---|---|---|
| Command / Response | Value | Data |
| AUR Cmd | 0x01 | Time Out Value |
| AUR Resp | 0x11 | UA of Responding Device |
| AUF Cmd | 0x02 | Family Byte + Time Out Value |
| AUF Resp | 0x12 | UA of Responding Device |
| AHNA Cmd | 0x03 | UA of Target Device NA Assigned to Target Device |
| AHNA Resp | 0x13 | TLV Capabilities |

US 11,554,077 B1

Page 2

Related U.S. Application Data (60) Provisional application No. 61/787,809, filed on Mar. 15, 2013.

(51) Int. Cl.
  G05B 19/042 (2006.01)
  H04L 61/5038 (2022.01)
  G05B 15/02 (2006.01)
  H04L 41/046 (2022.01)
  H04L 67/10 (2022.01)
  H04L 61/103 (2022.01)

(52) U.S. Cl.
  CPC ........ H04L 12/2809 (2013.01); H04L 41/046 (2013.01); H04L 61/5038 (2022.05); H04L 67/10 (2013.01); *A61H 33/0095* (2013.01); *A61H 2033/0083* (2013.01); *A61H 2201/501* (2013.01); *A61H 2201/5007* (2013.01); *A61H 2201/5012* (2013.01); *A61H 2201/5015* (2013.01); *A61H 2201/5043* (2013.01); *A61H 2201/5097* (2013.01); *G05B 2219/21081* (2013.01); *G05B 2219/25096* (2013.01); *H04L 61/103* (2013.01); *H04L 2012/285* (2013.01)

(58) Field of Classification Search
  CPC ............... H04L 12/2809; H04L 41/046; H04L 61/5038; H04L 67/10; H04L 67/01; H04L 61/103; H04L 2012/285; A61H 33/005; A61H 33/0095; A61H 2033/0083; A61H 2201/5007; A61H 2201/501; A61H 2201/5012; A61H 2201/5015; A61H 2201/5043; A61H 2201/5097
  See application file for complete search history.

(56) References Cited

U.S. PATENT DOCUMENTS

| | | | |
|---|---|---|---|
| 8,923,749 | B2 | 12/2014 | Igoe |
| 9,538,355 | B2 | 1/2017 | Zhang et al. |
| 11,426,325 | B2 | 8/2022 | Blaine et al. |
| 2004/0221067 | A1 | 11/2004 | Huang et al. |
| 2005/0033826 | A1 | 2/2005 | Jones et al. |
| 2007/0093920 | A1 | 4/2007 | Farpo et al. |
| 2007/0294443 | A1 | 12/2007 | Berenbaum et al. |
| 2008/0304408 | A1 | 12/2008 | Kraemer et al. |
| 2010/0145479 | A1* | 6/2010 | Griffiths ................. H04L 67/12 700/17 |
| 2010/0299401 | A1 | 11/2010 | Lloyd |
| 2010/0299430 | A1* | 11/2010 | Powers ............... H04L 63/1416 709/224 |
| 2011/0002261 | A1 | 1/2011 | Mocanu et al. |
| 2011/0196990 | A1 | 8/2011 | Govindaraju et al. |
| 2011/0286859 | A1 | 11/2011 | Ortiz et al. |
| 2012/0093508 | A1 | 4/2012 | Baykal et al. |
| 2012/0151159 | A1* | 6/2012 | Muralimanohar ..... A01N 65/00 711/E12.001 |
| 2012/0185571 | A1 | 7/2012 | Uy |
| 2012/0221746 | A1 | 8/2012 | Grinberg |
| 2012/0239206 | A1 | 9/2012 | Sauer et al. |
| 2012/0265860 | A1 | 10/2012 | Bockus et al. |
| 2013/0027176 | A1 | 1/2013 | Stocker |
| 2013/0124763 | A1 | 5/2013 | Kessler |
| 2013/0188514 | A1 | 7/2013 | Jain |
| 2013/0211546 | A1 | 8/2013 | Lawson et al. |
| 2013/0212574 | A1 | 8/2013 | Hutchinson et al. |
| 2014/0064139 | A1 | 3/2014 | Mcqueen et al. |
| 2017/0346688 | A1 | 11/2017 | Reddy et al. |

OTHER PUBLICATIONS

Office Action dated May 20, 2016, issued in connection with U.S. Appl. No. 14/213,172 (26 pages).

Extended European Search Report dated Oct. 4, 2016, issued in connection with European Application No. 14765575.7 (8 pages).

Office Action dated Feb. 21, 2017, issued in connection with U.S. Appl. No. 14/213,172 (31 pages).

Office Action dated Nov. 13, 2017, issued in connection with U.S. Appl. No. 14/213,172 (34 pages).

Office Action dated Jun. 25, 2018, issued in connection with U.S. Appl. No. 14/213,172 (35 pages).

Australian Examination Report No. 1, dated Jan. 18, 2019, issued in connection with Australian Application No. 2014229102 (6 pages).

European Examination Report dated March 4, 2019, issued in connection with European Application No. 14765575.7 (7 pages).

European Examination Report dated Sep. 12, 2019, issued in connection with European Application No. 14765575.7 (7 pages).

Australian Examination Report No. 2, dated Sep. 23, 2019, issued in connection with Australian Application No. 2014229102 (4 pages).

Australian Examination Report No. 3, dated Jan. 7, 2020, issued in connection with Australian Application No. 2014229102 (7 pages).

Canadian Office Action dated Apr. 24, 2020, issued in connection with Canadian Application No. 2,906,071 (4 pages).

Communication under Rule 71(3) EPC (Intention to Grant) dated Sep. 9, 2020, issued by the European Patent Office in connection with European Application No. 14765575.7 (5 pages).

Office Action dated May 24, 2021, issued in connection with U.S. Appl. No. 14/213,172 (8 pages).

Canadian Office Action dated May 13, 2021, issued in connection with Canadian Application No. 2,906,071 (4 pages).

Office Action dated Sep. 20, 2021, issued in connection with U.S. Appl. No. 14/213,172 (11 pages).

Extended European Search Report dated Sep. 7, 2021, issued in connection with European Application No. 21172073.5 (9 pages).

Examiner Interview Summary Record dated Mar. 25, 2022, in connection with U.S. Appl. No. 14/213,172 (4 pages).

Notice of Allowance and Examiner Interview Summary Record dated Apr. 18, 2022, in connection with U.S. Appl. No. 14/213,172 (20 pages).

* cited by examiner

| Discovery Commands |||
|---|---|---|
| Command / Response | Value | Data |
| AUR Cmd | 0x01 | Time Out Value |
| AUR Resp | 0x11 | UA of Responding Device |
| AUF Cmd | 0x02 | Family Byte + Time Out Value |
| AUF Resp | 0x12 | UA of Responding Device |
| AHNA Cmd | 0x03 | UA of Target Device<br>NA Assigned to Target Device |
| AHNA Resp | 0x13 | TLV Capabilities |

SYSTEM AND METHOD FOR DYNAMIC DEVICE DISCOVERY AND ADDRESS ASSIGNMENT

CROSS REFERENCE TO RELATED APPLICATIONS

The present application is a continuation of U.S. patent application Ser. No. 14/213,172, filed on Mar. 14, 2014, which claims priority to U.S. Provisional Patent Application Ser. No. 61/787,809, filed on Mar. 15, 2013, the entire disclosures of which are expressly incorporated herein by reference.

FIELD OF THE INVENTION

The present invention relates to device discovery and address assignment for various devices on a network. More particularly, the present invention relates to a system and method for dynamic device discovery and address assignment for pool/spa equipment interconnected via a network.

BACKGROUND OF THE INVENTION

Typically, discovery of devices on a half-duplex serial bus is accomplished by incrementing through a pre-defined address range, sending a response request to devices that are connected to a network, and recording the devices that respond. The Modbus communications protocol is one example of this approach.

In Modbus and other similar incremental addressing schemes, device enrollment can present some problematic conditions. For example, each device must be pre-addressed with a unique address to prevent multiple devices from having an identical address. This requirement makes setup and configuration of a network both a time consuming and error prone process. Therefore, it would be desirable to provide a network device discovery protocol that does not require pre-assignment of device addresses, yet allows any number of like devices to be added to the network.

SUMMARY OF THE INVENTION

The present invention overcomes the disadvantages and shortcomings of the prior art by providing a system and method for dynamic device discovery and address assignment for a network. The system transmits a device discovery request from a master device on a network, such as a pool/spa system controller, and receives a discovery response from a slave device which includes an pre-configured identifier. The system determines a network address based on the slave device identifier, and transmits an enrollment instruction with the network address to be used by the slave device. The system could be used to discover and assign addresses to various types of devices on a pool/spa network, such as pumps, underwater lights, chlorinators, water feature controllers, remote controllers, and/or other types of devices.

A pool or spa system for a pool or spa is disclosed that includes components operatively coupled via a communications network supporting dynamic device discovery. The system can include slave devices and a master controller. Each slave device is configured to perform one or more operations with respect to the pool or spa. Each of the slave devices are initially un-configured and have a unique device identifier associated therewith. The master controller is operatively coupled to the slave devices to form a network. The master controller is programmed to assign each of the slave devices a network address based on the unique identifier of each of the slave devices and in response to bidirectional communication between the master controller and the slave devices to configure the slave devices and enable addressed communication between the controller and the slave devices. The slave devices could include a pump, a filter, a sensor, a heater, or other equipment.

The master controller can broadcast a device discovery request on the network requesting a response from the slave devices and can receive, in response to the device discovery request, a response from a first device of the slave devices including the unique identifier associated with the first device. The master controller can correlate the device identifier received from the first device with an available network address, assign the network address to the first device, and can transmit a message on the network that includes the device identifier and the network address. The first device can receive the message, compare the device identifier in the message to the device identifier of the first device, and store the network address as the network address of the first device based on a determination that the device identifier included in the message matches the device identifier of the first device. At least one slave device can be configured such that it does not retain the network address assigned by the master controller when the slave device is powered down. The master controller can be programmed to periodically determine whether the network includes a slave device requiring configuration and/or can be programmed to maintain at least one table correlating the unique device identifier of each of the slave devices with the network address assigned to each of the slave devices.

The pool or spa system can include a gateway device operatively coupled between at least one of the slave devices and the master controller. The gateway communicates with the master controller on behalf of the at least one of the slave devices to facilitate assignment of the network address to the at least one of the slave devices.

A system for dynamic discovery of networked devices in a pool or spa system is disclosed that includes a non-transitory computer-readable medium and a processing device (or master controller). The non-transitory computer-readable medium stores computer executable instructions for a process of dynamically discovering networked devices in a pool or spa system. The processing device is programmed to execute the computer executable instructions to transmit a broadcast message including a device discovery request to the networked devices in the pool or spa system, receive a response message from an un-configured pool or spa device in the pool or spa system that includes a unique device identifier associated with the un-configured device, correlate the unique device identifier with a network address, and transmit the network address to the un-configured pool or spa device to transform the un-configured pool or spa device to a configured pool or spa device.

Also provided is a method of dynamically discovering networked devices in a pool or spa system. The method includes the steps of transmitting a broadcast message including a device discovery request to the networked devices in the pool or spa system, receiving a response message from an un-configured pool or spa device in the pool or spa system that includes a unique device identifier associated with the un-configured device, correlating the unique device identifier with a network address, and transmitting the network address to the un-configured pool or spa device to transform the un-configured pool or spa device to a configured pool or spa device.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for dynamic device discovery and address assignment for a network, as discussed in detail below in connection with FIGS. 1-15.

Figure 1:
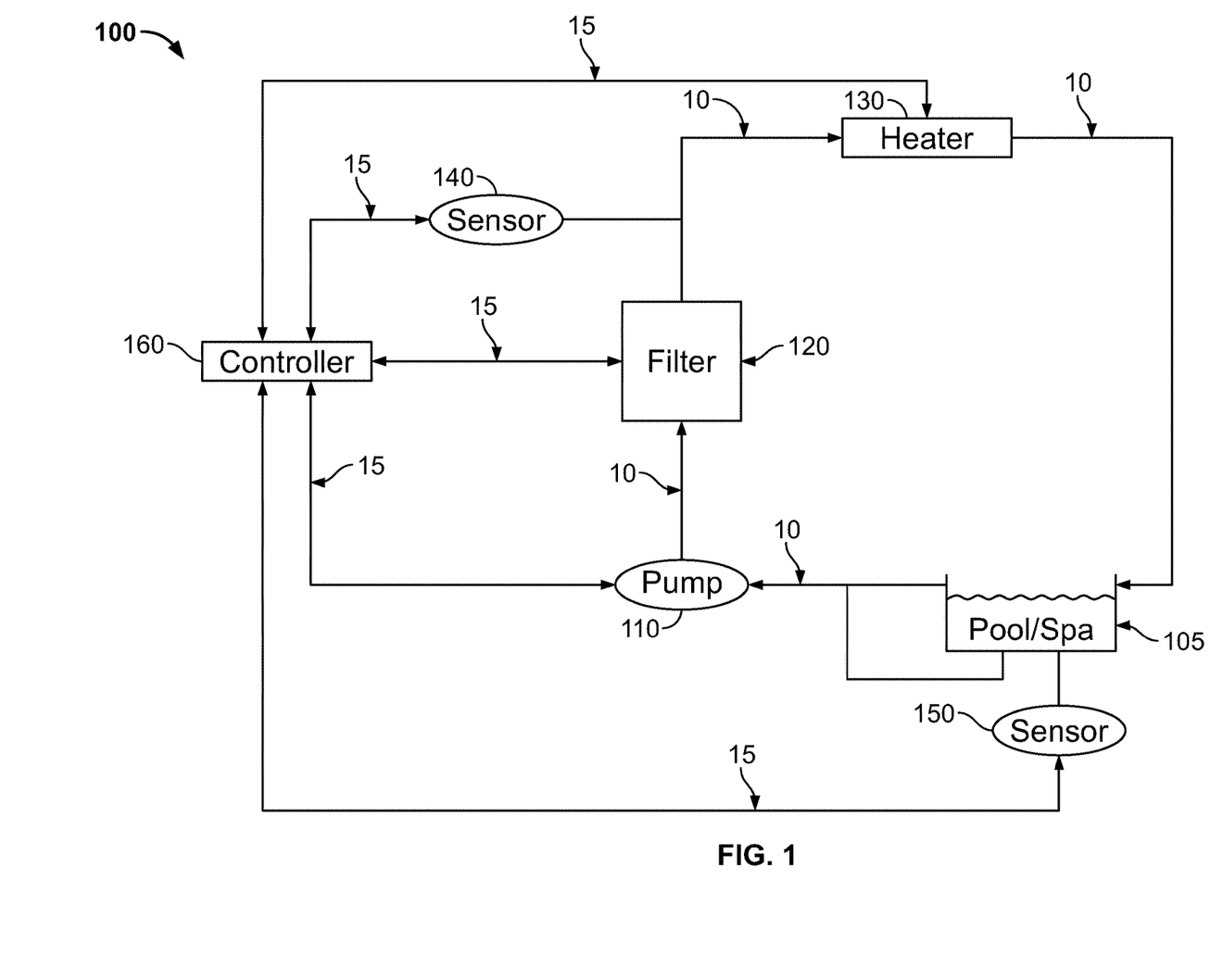
FIG. 1 is a diagram of a pool or spa pump system with a plurality of networked devices connected to a controller.

FIG. 1 is a diagram of a pool or spa pump system 100 with a plurality of networked pool or spa devices 110-150 connected to a controller 160. The controller 160 could be a central pool/spa system controller, such as the PRO LOGIC line of pool/spa systems controllers manufactured by Hayward Industries, Inc. In a typical pool or spa filter system 100, pump 110 is fluidly connected via pipes 10 to pool/spa 105. Pump 110 provides a positive water pressure to drive water through filter 120 to remove debris from pool/spa 105. Optionally, heater 130 can be fluidly connected to pump 110 to provide water heating of pool/spa 105 as desired. Sensors 140, 150 are strategically placed along the pool/spa system 100 to provide water measurements, for example, water pressure, temperature, salinity, etc. Sensors 140, 150 report measurements back to controller 160. The system 100 can include other device commonly utilized in a pool/spa system, such as underwater lights, chlorinators, water feature controllers, remote controllers, and/or other suitable types of pool or spa devices. Controller 160 provides a central control of the pool/spa system 100 to include, for example, timing of pump 110 operation, heater operation for temperature control, etc. As discussed in detail below, the controller 160 and the devices 110, 120, 130 can be operatively coupled (as shown by line 15) to form a network of devices that communicate in accordance with the present invention to facilitate dynamic discovery of devices on the network and to assign addresses thereto. One or more of the device 110-150 can be operatively coupled to the controller 160 via wires, cables, or buses, and/or can be in wireless communication with each other.

Figure 2:
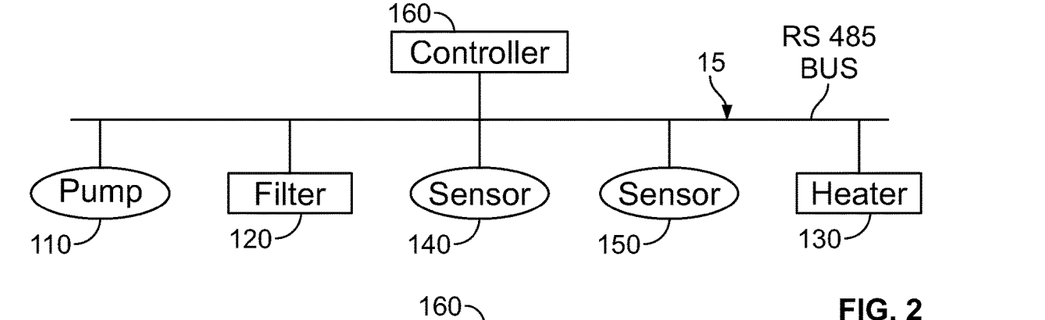
FIG. 2 is a diagram of a network system with a common bus connecting a plurality of network devices to a controller.

FIG. 2 is a diagram of a network system with a common data bus 15 (e.g. RS-485 half-duplex serial bus) connecting the plurality of network devices 110-150 to the controller 160. During installation of pool/spa system 100, networked devices are connected via data bus 15. Controller 160 provides operational control of pool/spa system 100. Instead of pre-coding each device 110-150 with a unique network address, controller 160 (e.g., a master unit) connected to pool/spa network 100 dynamically discovers devices operatively coupled to bus 15 and assigns each device a unique address at the time of discovery, as described herein. This removes the requirement that all devices 110-150 be pre-addressed, and advantageously allows any number of like devices 110'-150' (not shown) to co-exist with pre-existing devices 110-150. This method greatly reduces setup and configuration time as well as configuration errors by removing the manual process of pre-coding network addresses.

Figure 3:
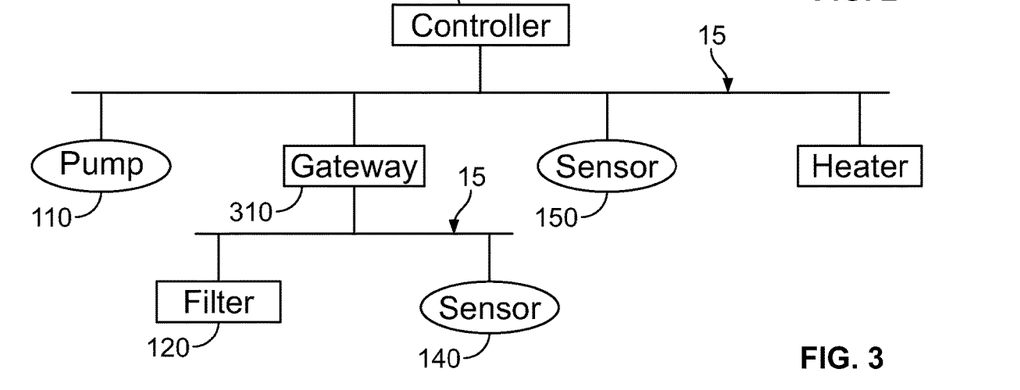
FIG. 3 is a diagram showing a gateway connecting network devices to a controller.

FIG. 3 is a diagram showing gateway 310 connecting networked devices 120, 140 to the controller 160. In this embodiment, the gateway 310 allows the network to be segmented. In one exemplary embodiment, the gateway 310 is itself a smart component with the added responsibility of distributing data/information as messages (e.g., in the form of packets) to/from the local RS-485 bus 15. Further, each gateway 310 can be responsible for initiating the discovery process on its local bus. Gateway 310 creates a table of unique addresses (e.g., device identifiers) that are sent to controller 160 for network address assignment.

Figure 4:
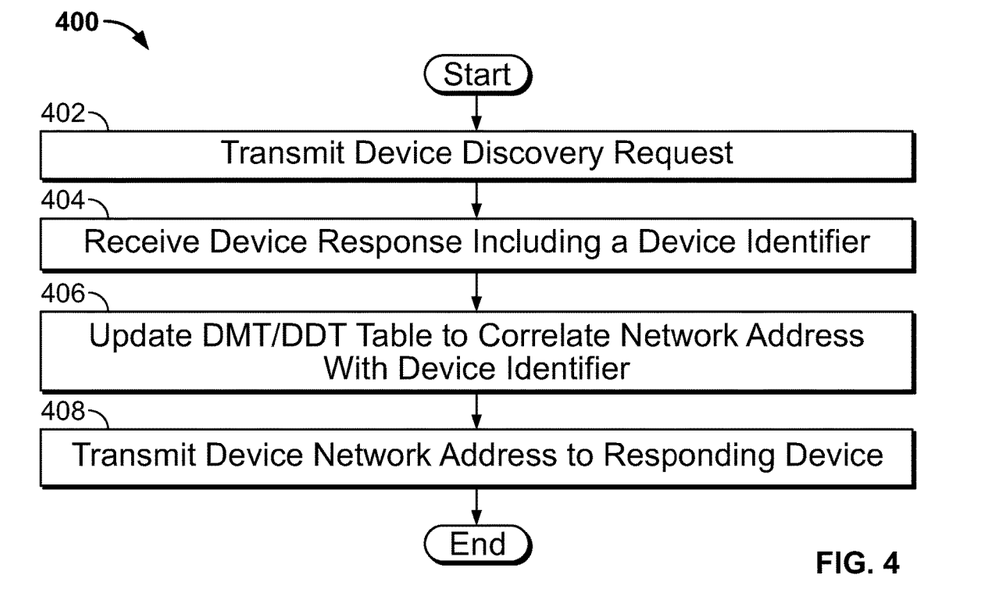
FIG. 4 is a flowchart showing overall processing steps performed by the system for dynamic device discovery and address assignment.

FIG. 4 is a flowchart illustrating processing steps carried out by the system (e.g., the controller 160 and/or gateway 310) for dynamic device discovery and address assignment over a network. The system allows a controlling device (e.g., a master pool/spa controller) to discover all subordinate/slave devices (e.g., pumps, lights, filters, heaters, sanitization equipment, gateways, etc.) present on a network (e.g. a half-duplex RS-485 serial bus). This protocol provides the master with the ability to find all devices at initial power up, as well as find any devices that are added to the network at points in time after the initial discovery has completed. To facilitate device discovery, controller 160 transmits or broadcasts a message in the form of device discovery request on the network at step 402. Every un-configured slave network device 110-150 (e.g., device without an assigned network address) responds to the device discovery request. The responses transmitted by the un-configured device 110-150 are messages that can include device identifiers, At step 404, controller 160 receives a device response including a device identifier from each of the un-configured devices 110-150. The controller can maintain one or more tables to store network address information and device identifier information in non-transitory computer-readable media (e.g., device memory). At step 406, controller 160 updates two tables, including a device mapping table (DMT) and a device descriptor table, in device memory to correlate a network address (described below) with the device identifier for each un-configured device 110-150 from which the controller receives a response. Then, in step 408, controller 160 transmits the device network address assignment in a message to each of the responding devices (e.g, based on the correlation performed in step 406). This transforms the particular un-configured devices that responded to the device discovery request to configured devices. After a device is configured with a network address, the device will thereafter no longer respond to a device discovery request issued by the controller. This configuration/enrollment process continues until all un-configured devices 110-150 that respond to the device discovery request receive a network address. Controller 160 can maintain the device mapping table that maps device identifiers to network addresses in non-volatile RAM (NVRAM). Storing the device mapping in NVRAM allows faster startup times as the mapping only needs verification as opposed to initial creation. In one embodiment, slave devices 110-150 do not save the network address in NVRAM to allow for reconfigured and reassigned network addresses on every power up, system reset, or local device reset.

The dynamic discovery process 400 allows slave smart components (SC), e.g. device 110-150, to be assigned a Network Address (NA) within a network (e.g., a pool/spa network 100). Discovery requests are addressed to the broadcast address, e.g. 0xFF, and responses are directed to the bus master address, e.g. 0x00. Each SC leaves the factory with a Unique Address (UA), e.g. device identifier, which is analogous to a MAC address, but is not reflective of a network address to be assigned by a controller in a network. In an exemplary embodiment, each device 110-160 (master and slave) on the bus 15 has a pre-programmed Unique Address (UA). For example, the UA is the device's serial number which is built into the device through a manufacturing process. One of the fields of the UA is a product code that defines the product type, and the other fields uniquely identify that particular device (e.g., a string of characters that can be used to distinguish the particular device from other devices of the same product type).

Figure 5:
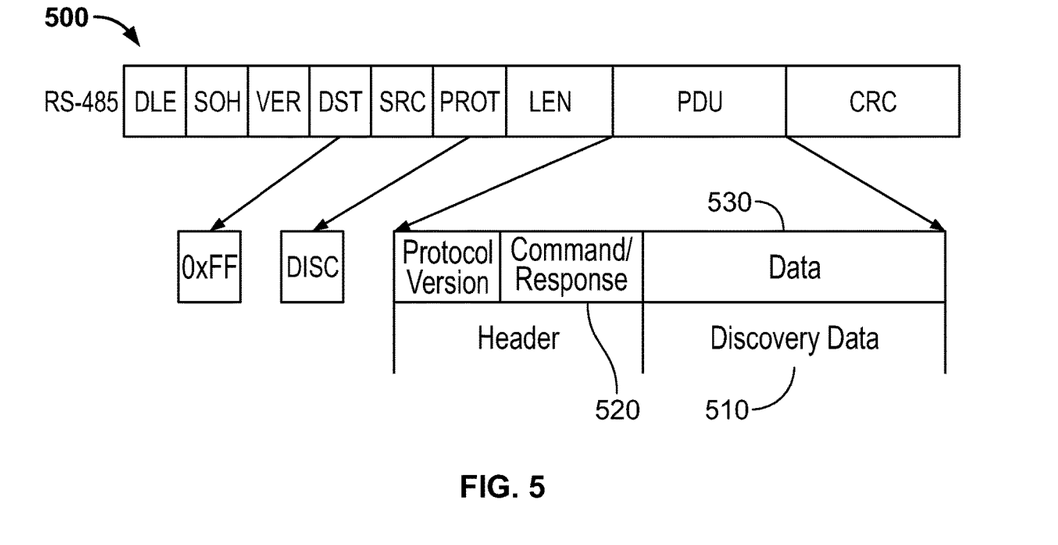
FIGS. 5-14 are diagrams showing various data structures in accordance with the present invention.

FIG. 5 shows an exemplary device packet 500 format. When a discovery request transmission is received by a device 110-150, if un-configured (i.e. no network address assigned) a packet 500 is sent from the device 110-150 back to controller 160 that includes the unique address in discovery data 510 in a data portion 530 of the packet 500. The Command/Response portion 520 of the packet 500 includes a header that provides further information as to what is included in the data portion 530 of the packet 500.

Figure 6:
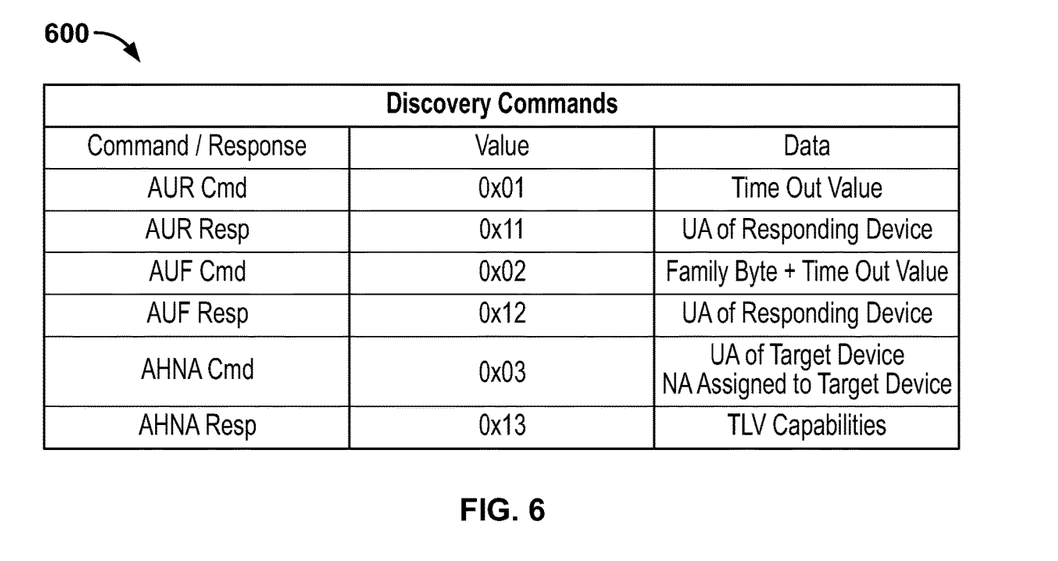

FIG. 6 shows an exemplary discovery command table 600. Depending on a value 610 associated with the Command/Response portion 520 of the packet 500, the packet 500 is defined based on from where it is being transmitted (i.e., from controller 160 for request, or from slave device 110-150 responding). FIGS. 7-12 illustrate exemplary packets that can be transmitted in accordance with embodiments of the present disclosure that can include the commands shown in the table 600.

Figure 7:
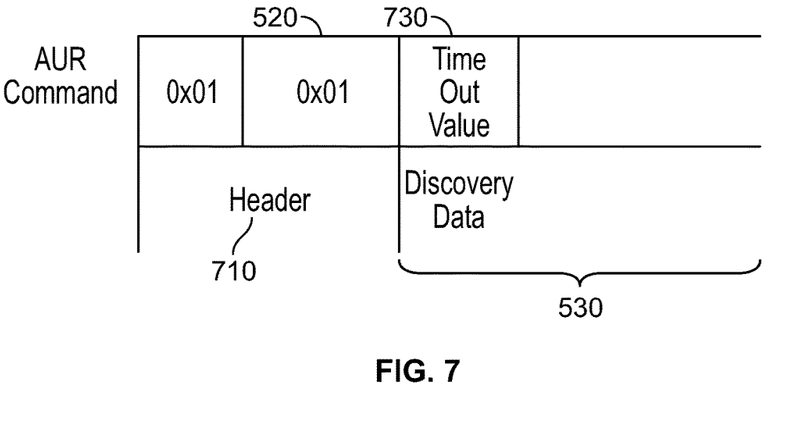
Figure 8:
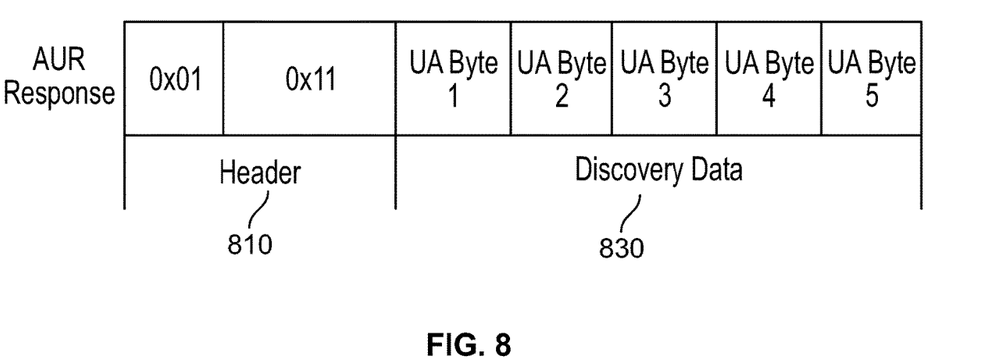

Referring now to FIG. 7, when the discovery request packet is sent from the controller 160, the packet can include a command ("AUR Cmd") in the Command/Response portion 520 of a header 710 defined by, e.g., a value of 0x01, which corresponds to a time out command transmitted by the controller 160. A time out value 730 is used to adjust the length of time that controller 160 will wait for responses before timing out. This byte is a value in tens of milliseconds, e.g., 1-10 ms. When a slave device 110-150 responds, the packet format would be as shown in FIG. 8 with header 810 (e.g., including a command value 0x011 corresponding to an response from a slave device) and discovery data 830 (e.g., including a UA of the device). UA bytes 1-5 in the discovery data 830 would then be used by the controller 160 to define the network address of the responding slave device 110-150. Once controller 160 has sent a discovery response request, it will not respond during the time out period. It will only receive the discovery responses from devices 110-150 and store them in a list until timeout is reached. After the timeout period expires the controller 160 then proceeds to assign a network address to each of the un-configured devices discovered.

Figure 9:
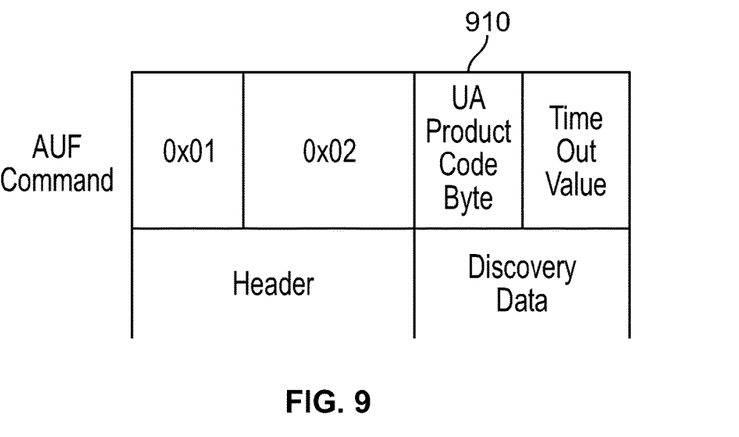
Figure 10:
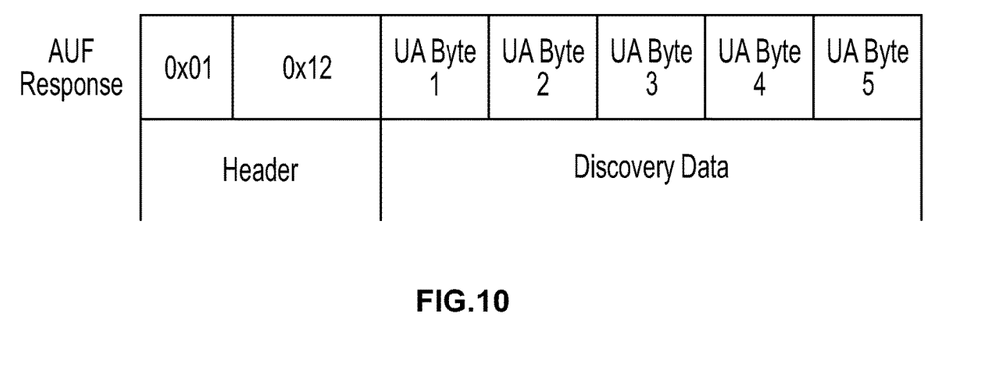

Alternatively, controller 160 can send a family-specific device discovery request using a command value of, e.g., 0x02, in the header of the packet, (e.g. temperature sensors only, heater only, pool lighting only, etc.) and by setting the UA product code byte 910 accordingly, as shown in FIG. 9. The UA product code byte 910 describes the type of the device, e.g., temperature sensor, heater, pool/spa light, etc. All connected devices 110-150 compare this code to their own product code within the UA and respond to the controller 160 if there is a match. A packet transmitted by a device in response to a family-specific device discovery request is shown in FIG. 10. If gateway 310 is installed, the gateway 310 will send its own local device discovery request to determine devices 120, 140 are connected to its local ports. Further, gateway 310 will be the last device to be discovered with a directed discovery (family-specific) to allow time for gateway 310 to discover all devices that are connected locally on the downstream bus 15. Each time gateway 310 is polled by controller 160, a UA of one un-configured device will be returned. Controller 160 will continue to poll each gateway 310 installed in the network until no response is returned, signifying completion of device discovery by the gateway 310.

Figure 11:
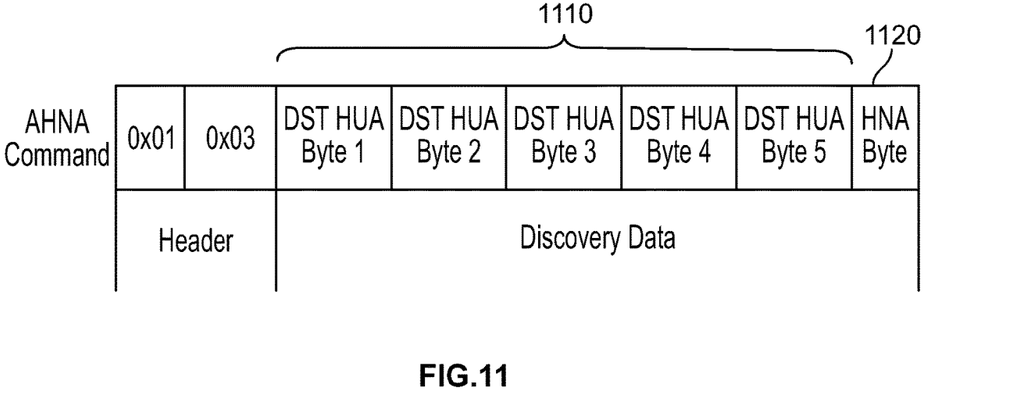
Figure 12:
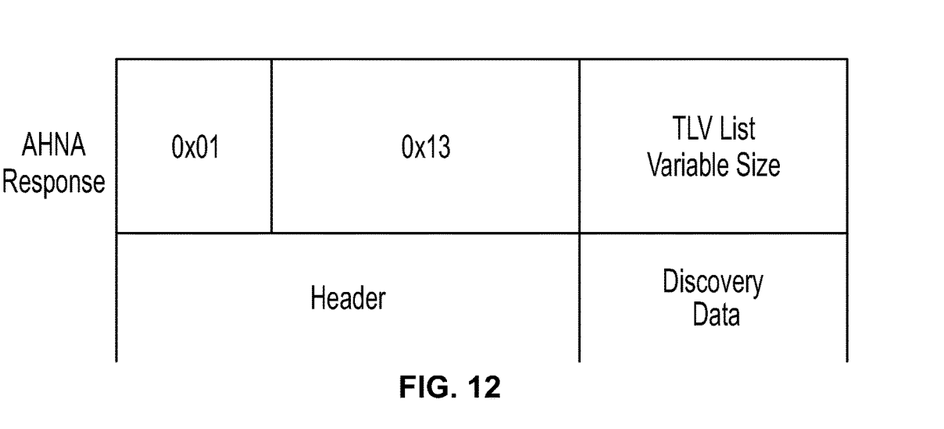

Referring now to FIG. 11, once controller 160 receives a response from a device 110-150, the command assigning a network address to the responding device 110-150 is sent (e.g., given by a value of 0x03 in the header). DST UA Bytes 1-5 1110 address the assignment command to the desired device, and the NA byte 1120 is assigned to the desired device via the packet shown in FIG. 11. Additionally, FIG. 12 shows a response (AHNA), which returns (describes) the capabilities of the newly discovered device.

Figure 13:
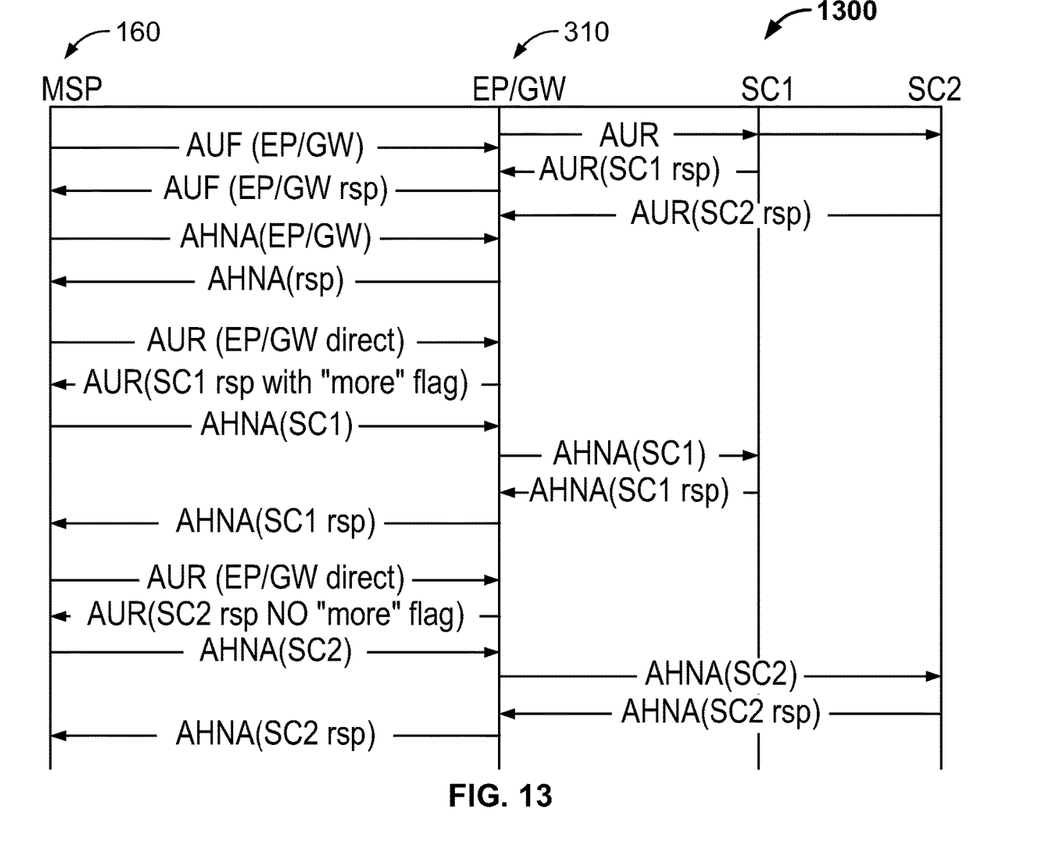

FIG. 13 shows a discovery communication process 1300 conducted in accordance with the present invention between controller 160 (MSP), a gateway 130, and two or more slave devices (indicated as SC1 and SC2 in FIG. 13). Network addresses are assigned to devices connected to the gateway 310 last to allow each gateway 310 more time to gather locally-discovered devices. When a gateway 310 responds to a directed AUR/AUF request, it responds with the first device in its list. This response also contains a flag "more to send" to indicate to controller 160 that there are more devices to assign network addresses. Controller 160 continues to send directed requests to gateway 310 until the "more to send" flag is disabled.

Figure 14:
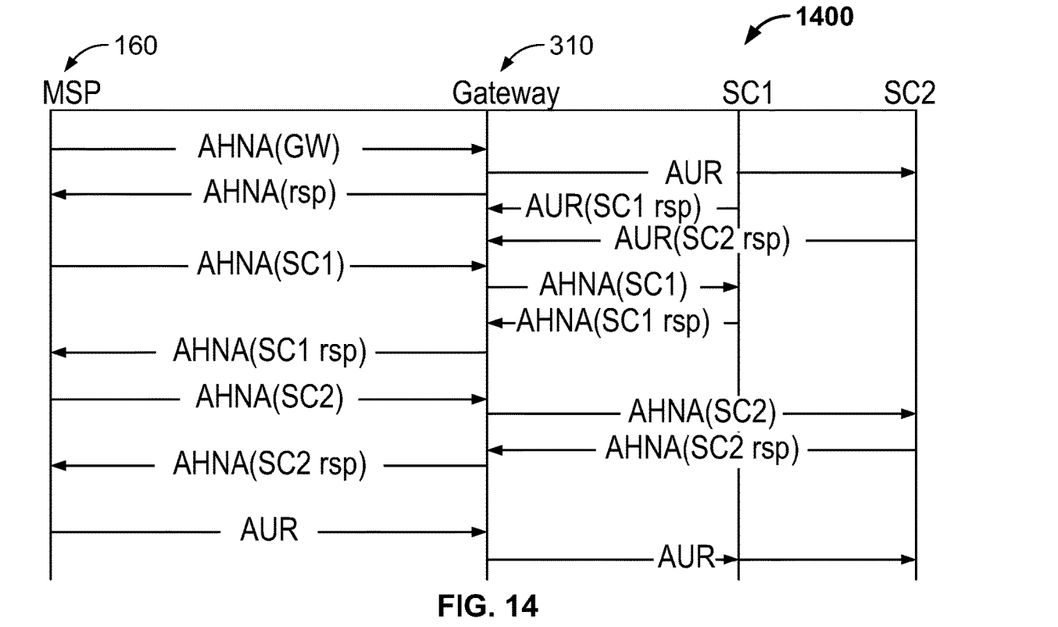

FIG. 14 shows a dataflow 1400 of a startup of an existing network system (i.e., after power interruption). Controller 160 ("MSP") already contains a saved structure of mapping in non-volatile memory, and it steps through the saved mapped network to poll existing network devices and listens for responses from each connected device. The first devices configured are gateways 310 to allow time for gateway polling of connected devices (e.g., "SC1" and "SC2"). If a previously connected device is not heard from, a directed command can be sent. A mapping table maintained by the master device is updated with any non-responsive devices as not connected to the network and a device discovery request is then sent to find any newly connected devices to the network.

When a system is powered-up which utilizes the dynamic discovery protocol described herein, the controlling master device (e.g., controller 160) sends a discovery request packet to the broadcast address. All operational devices on the bus will receive this packet. Every unconfigured slave device (e.g., no assigned NA) will respond to the discovery request with its UA. In one embodiment, each slave uses a random backoff timer to reduce the number of collisions during the discovery period. As the master device receives a response, it assigns and transmits a NA configuration command to the UA of the responding (unconfigured) slave device. Only the slave device with the matching UA will accept the NA assignment. This slave is now considered configured and will no longer respond to discovery requests. As more slave devices enter the configured state, the number of collisions subsides. The discovery process continues until no more devices respond. At this time the network has settled and normal operation of the network will continue. In an exemplary embodiment, the master device is programmed to send a device discovery request upon startup, and at regular or periodic intervals as desired. In exemplary embodiments, the Gateway cannot push newly discovered devices back to the master device without a discovery request from the master device.

Figure 15:
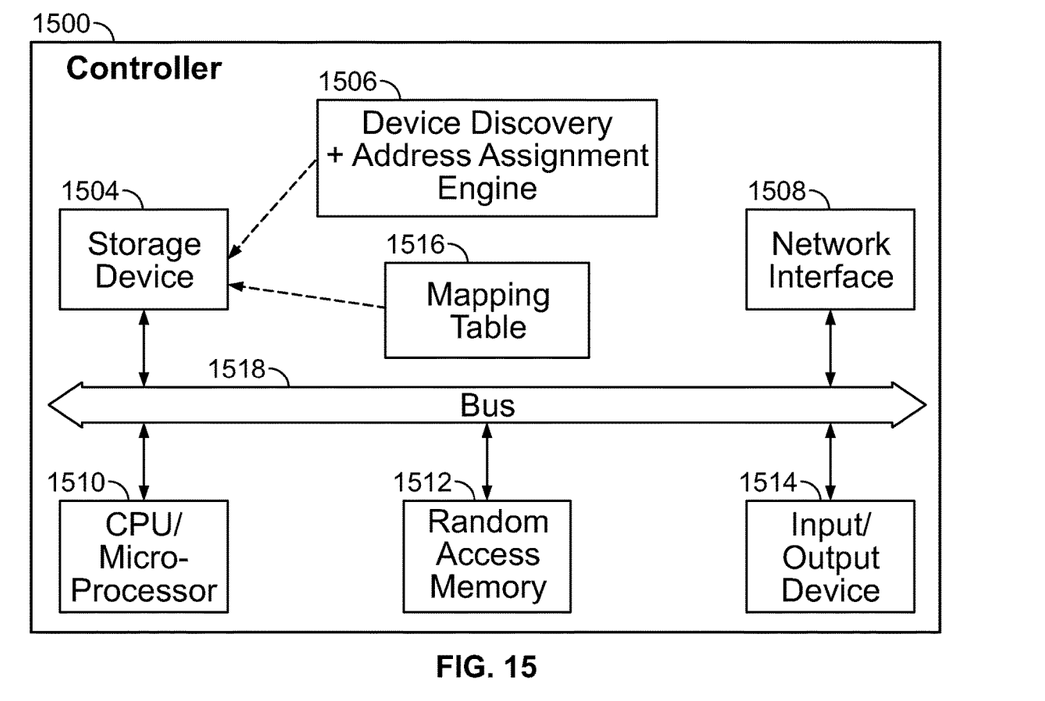
FIG. 15 is a diagram showing hardware and software components of a device capable of performing the processes of the present invention.

FIG. 15 is a diagram showing hardware and software components of a controller system 1500 capable of performing the processes discussed above. The system 1500 includes a processing server 1502, e.g., a computer, and the like, which can include a storage device 1504, a network interface 1508, a communications bus 1518, a central processing unit (CPU) 1510, e.g., a microprocessor, and the like, a random access memory (RAM) 1512, and one or more input devices 1514, e.g., a keyboard, a mouse, and the like. The processing server 1502 can also include a display, e.g., a liquid crystal display (LCD), a cathode ray tube (CRT), and the like. The storage device 1504 can include any suitable, non-transitory computer-readable storage medium, e.g., a disk, non-volatile memory, read-only memory (ROM), erasable programmable ROM (EPROM), electrically-erasable programmable ROM (EEPROM), flash memory, field-programmable gate array (FPGA), and the like. The processing server 1502 can be, e.g., a networked computer system, a personal computer, a smart phone, a tablet, and the like.

The present invention can be embodied as a dynamic device discovery and address assignment software module and/or engine 1506, which can be embodied as computer-readable program code stored on the storage device 1504 and executed by the CPU 1510 using any suitable, high or low level computing language, such as, e.g., Java, C, C++, C#, .NET, and the like. The network interface 1508 can include, e.g., an Ethernet network interface device, a wireless network interface device, any other suitable device which permits the processing server 1502 to communicate via the network, and the like. The CPU 1510 can include any suitable single- or multiple-core microprocessor of any suitable architecture that is capable of implementing and/or running the dynamic device discovery and address assignment software 1506, e.g., an Intel processor, and the like. The random access memory 1512 can include any suitable, high-speed, random access memory typical of most modern computers, such as, e.g., dynamic RAM (DRAM), and the like. A mapping table 1516 can be stored in the storage device 1504.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention. What is desired to be protected by Letters Patent is set forth in the following appended claims.

What is claimed is:

1. A pool or spa system supporting dynamic device discovery, the system comprising:
a pool or spa slave device operable to perform one or more operations with respect to a pool or spa, the pool or spa slave device being un-configured and having a first unique device identifier, the pool or spa slave device including: 1) a communication interface configured for bidirectional communication with a master controller via a network; and 2) a processor configured to:
receive a discovery request packet from the master controller over the network;
transmit a discovery request response packet including the first unique device identifier of the un-configured pool or spa slave device, the first unique device identifier transmittable as a plurality of data fields within the discovery request response packet, said plurality of data fields comprising a first data field identifying a device type of the pool or spa slave device and a second data field distinguishing the pool or spa slave device from one or more other pool or spa slave devices of the same device type;
receive a configuration command packet from the master controller over the network, the configuration command packet including a second unique device identifier and an available network address;
determine if the second unique device identifier matches the first unique device identifier; and
configure the pool or spa slave device to communicate using the available network address based on a determination that the second unique device identifier matches the first unique device identifier, thereby enabling addressed communication between the pool or spa slave device and the master controller.

2. The system of claim 1, wherein the discovery request response packet describes at least one capability of the pool or spa slave device.

3. The system of claim 1, wherein the discovery request response packet comprises a header corresponding to a discovery request response and a data portion including the first unique device identifier associated with the pool or spa slave device.

4. The system of claim 1, wherein the pool or spa slave device does not retain the available network address when the pool or spa slave device is powered down.

5. The system of claim 1, wherein the communication interface of the pool or spa slave device communicates with the master controller by way of a gateway device operatively coupled therebetween to facilitate assignment of the available network address to the pool or spa slave device.

6. The system of claim 1, wherein the master controller is operatively coupled to one or more additional pool or spa slave devices by way of the network, the additional pool or spa slave devices including at least one of a pump, a filter, a sensor, or a heater.

7. The system of claim 1, wherein the pool or spa slave device is a pump.

8. The system of claim 1, further comprising the master controller.

9. The system of claim 1, wherein the communication interface is configured to communicate with the master controller over an RS-485 serial connection.

10. The system of claim 1, wherein the communication interface is configured to wirelessly communicate with the master controller.

11. The system of claim 1, comprising wherein the processor is configured to execute a random backoff timer to reduce packet collisions during a discovery period.

12. A method of dynamically discovering a pool or spa device in a pool or spa system, comprising the steps of:
receiving at a communication interface of an un-configured pool or spa slave device a discovery request packet from a master controller over a network connection;

transmitting a discovery request response packet from the communication interface of the pool or spa slave device to the master controller over the network connection, the discovery request response packet including a first unique device identifier associated with the pool or spa slave device, the first unique device identifier transmittable as a plurality of data fields within the discovery request response packet, said plurality of data fields comprising a first data field identifying a device type of the pool or spa slave device and a second data field distinguishing the pool or spa slave device from one or more other pool or spa slave devices of the same device type;

receiving a configuration command packet at the communication interface of the pool or spa slave device from the master controller, the configuration command packet including a second unique device identifier and an available network address;

determining if the second unique device identifier matches the first unique device identifier; and configuring the pool or spa slave device to communicate using the available network address based on a determination that the second unique device identifier matches the first unique device identifier, thereby enabling addressed communication between the pool or spa slave device and the master controller.

13. The method of claim 12, wherein the discovery request response packet describes at least one capability of the pool or spa slave device.

14. The method of claim 12, wherein the discovery request response packet comprises a header corresponding to a discovery request response and a data portion including the first unique device identifier associated with the pool or spa slave device.

15. The method of claim 12, comprising the steps of:
correlating the first unique device identifier received from the pool or spa slave device with the available network address;
assigning the available network address to the pool or spa slave device by the master controller based on said correlation; and
transmitting the configuration command packet from the master controller to the communication interface of the pool or spa slave device over the network connection, the configuration command packet including the first unique device identifier received from the pool or spa slave device and the available network address assigned by the master controller.

16. The method of claim 12, comprising the step of periodically determining by the master controller whether another pool or spa slave device in communication therewith requires configuration.

17. The method of claim 12, comprising the step of maintaining at least one table correlating the first unique device identifier associated with the pool or spa slave device with the available network address.

18. The method of claim 12, comprising the step of establishing a connection with a gateway device operatively coupled between the communication interface of the pool or spa slave device and the master controller, the gateway device communicating with the master controller on behalf of the pool or spa slave device to facilitate assignment of the available network address to the pool or spa slave device.

19. The method of claim 12, comprising the step of establishing a network between the pool or spa slave device, the master controller, and one or more additional pool or spa slave devices, the additional pool or spa slave devices including at least one of a pump, a filter, a sensor, or a heater.

20. The method of claim 12, wherein the pool or spa slave device is a pump.

21. The method of claim 12, wherein the communication interface communicates with the master controller over an RS-485 serial connection.

22. The method of claim 12, wherein the communication interface is in wireless communication with the master controller.

23. The method of claim 12, further comprising executing by the processor a random backoff timer to reduce packet collisions during a discovery period.

\* \* \* \* \*

UNITED STATES PATENT AND TRADEMARK OFFICE
CERTIFICATE OF CORRECTION

PATENT NO. : 11,554,077 B1
APPLICATION NO. : 17/898228
DATED : January 17, 2023
INVENTOR(S) : Blaine et al.

It is certified that error appears in the above-identified patent and that said Letters Patent is hereby corrected as shown below:

On the Title Page
Item (72) Inventors: in the address of the first inventor, "North Kingston, MA" should be --North Kingston, RI--
Item (57) Abstract: in the second line, "network address" should be --network addresses--
Item (56) References Cited: for U.S. Patent Document 2007/0093920, "Farpo et al." should be --Tarpo et al.--

In the Drawings
FIG. 3: a reference numeral 130 should be attached to the box labeled "Heater"
FIG. 14: a right-facing arrowhead should be placed after "AUR" in the first line In the Specification
Column 1, Lines 50-51: "an pre-configured" should be --a pre-configured--
Column 1, Lines 64-65: "Each of the slave devices are" should be --Each of the slave devices is--
Column 1, Line 65: "and have" should be --and has--
Column 3, Line 29: "pool or spa pump system 100" should be --pool or spa system 100--
Column 3, Lines 34-35: "pool or spa filter system 100" should be --pool or spa system 100--
Column 3, Line 44: "other device" should be --other devices--
Column 3, Line 55: "of the device" should be --of the devices--
Column 3, Line 67: "pool/spa network 100" should be --the pool/spa network--
Column 4, Line 32: "of device" should be --of a device--
Column 4, Line 34: "e.g., device" should be --e.g., a device--
Column 4, Line 37: "device 110-150" should be --devices 110-150--
Column 4, Lines 37-38: "device identifiers, At step 404" should be --device identifiers. At step 404--
Column 4, Line 50: "e.g," should be --e.g.,--
Column 5, Line 2: "device 110-150" should be --devices 110-150--
Column 5, Lines 3-4: "pool/spa network 100" should be --pool/spa network--
Column 5, Line 29: "a value 610" should he --a value--
Column 5, Line 32: "for request" should be --for a request--

Signed and Sealed this
Seventh Day of March, 2023

Katherine Kelly Vidal
*Director of the United States Patent and Trademark Office*

CERTIFICATE OF CORRECTION (continued)
U.S. Pat. No. 11,554,077 B1

Column 5, Lines 32-33: "slave device 110-150 responding" should be --a responding slave device 110-150--
Column 5, Line 48: "an response" should be --a response--
Column 6, Line 5: "to determine devices" should be --to determine whether devices--
Column 6, Lines 18-19: "Bytes 1-5 1110" should be --Bytes 1-5 (1110)--
Column 7, Lines 4-5: "the Gateway" should be --the gateway--
Column 7, Line 11: "processing server 1502" should be --processing server--
Column 7, Line 17: "processing server 1502" should be --processing server--
Column 7, Line 25: "processing server 1502" should be --processing server--
Column 7, Line 37: "processing server 1502" should be --processing server--

In the Claims
Claim 11: at Column 8, Line 59, "comprising wherein" should be --wherein--